(12) United States Patent
Davydov et al.

(10) Patent No.: US 10,470,064 B2
(45) Date of Patent: Nov. 5, 2019

(54) ENHANCED RADIO RESOURCE MANAGEMENT REPORTING IN CELLULAR SYSTEMS

(71) Applicant: Intel Corporation, Santa Clara, CA (US)

(72) Inventors: Alexei Vladimirovich Davydov, Nizhny Novgorod (RU); Ilya Bolotin, Nizhny-Novgorod (RU); Alexander Alexandrovich Maltsev, Jr., Nizhny Novgorod (RU); Gregory Vladimirovich Morozov, Nizhny Novgorod (RU); Vadim Sergeyevich Sergeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/565,202

(22) PCT Filed: Dec. 23, 2015

(86) PCT No.: PCT/US2015/000281
§ 371 (c)(1),
(2) Date: Oct. 9, 2017

(87) PCT Pub. No.: WO2016/182528
PCT Pub. Date: Nov. 17, 2016

(65) Prior Publication Data
US 2018/0152856 A1     May 31, 2018

Related U.S. Application Data (60) Provisional application No. 62/161,584, filed on May 14, 2015.

(51) Int. Cl.
*H04W 24/08*    (2009.01)
*H04B 7/022*    (2017.01)
(Continued)

(52) U.S. Cl.
CPC ............ *H04W 24/08* (2013.01); *H04B 7/022* (2013.01); *H04B 7/0413* (2013.01);
(Continued)

(58) Field of Classification Search
CPC .... H04B 7/022; H04B 7/0413; H04B 7/0417; H04B 17/309; H04W 24/08; H04W 24/10; H04L 1/0026; H04L 25/0204
See application file for complete search history.

(56) References Cited

U.S. PATENT DOCUMENTS

| | | | |
|---|---|---|---|
| 10,193,665 B2 * | 1/2019 | Chen | .................... H04L 1/0026 |
| 2008/0090573 A1 * | 4/2008 | Kim | .................... H04W 36/08 455/436 |

(Continued)

FOREIGN PATENT DOCUMENTS

| | | |
|---|---|---|
| CN | 107624225 A | 1/2018 |
| WO | WO-2014157867 A1 | 10/2014 |
| WO | WO-2016182528 A1 | 11/2016 |

OTHER PUBLICATIONS

"International Application Serial No. PCT/US2015/000281, International Preliminary Report on Patentability dated Nov. 23, 2017", 6 pgs.

(Continued)

*Primary Examiner* — Kevin C. Harper
(74) *Attorney, Agent, or Firm* — Schwegman Lundberg & Woessner, P.A.

(57) ABSTRACT

User Equipment (UE) and base station (eNB) apparatus and methodology for radio resource management reporting. The UE receives reference signals from at least one antenna port of an eNB via a plurality of receive antennas of the UE. The UE performs received signal measurement of at least a portion of the reference signals for a plurality of eNB antenna port and UE receive antenna combinational groupings to produce enhanced received signal quality (eRSQ)

(Continued)

measurements that represent spatial characteristics of the reference signaling as received by the UE. The UE may send a report to the eNB based on the eRSQ measurements, with the report being indicative of spatial multiplexing layer availability of the UE to be served by the eNB.

26 Claims, 6 Drawing Sheets (51) Int. Cl.
  *H04B 7/0417*    (2017.01)
  *H04B 7/06*    (2006.01)
  *H04B 7/0413*    (2017.01)
  *H04L 5/00*    (2006.01)
  *H04W 72/08*    (2009.01)
  *H04B 17/309*    (2015.01)

(52) U.S. Cl.
  CPC ......... *H04B 7/0417* (2013.01); *H04B 7/0632* (2013.01); *H04L 5/0048* (2013.01); *H04W 72/085* (2013.01); *H04B 17/309* (2015.01)

(56) References Cited

U.S. PATENT DOCUMENTS

| | | | |
|---|---|---|---|
| 2010/0159854 A1* | 6/2010 | Kim | H04B 7/04 |
| | | | 455/101 |
| 2010/0322328 A1 | 12/2010 | Schirmacher et al. | |
| 2012/0220327 A1* | 8/2012 | Lee | H04W 72/1273 |
| | | | 455/509 |
| 2013/0021925 A1* | 1/2013 | Yin | H04B 7/024 |
| | | | 370/252 |
| 2013/0182594 A1* | 7/2013 | Kim | H04W 72/042 |
| | | | 370/252 |
| 2013/0344816 A1* | 12/2013 | Niu | H04W 48/16 |
| | | | 455/67.13 |
| 2014/0016497 A1 | 1/2014 | Seo et al. | |
| 2014/0269452 A1* | 9/2014 | Papasakellariou | H04B 7/2643 |
| | | | 370/280 |
| 2015/0029875 A1 | 1/2015 | Zhu et al. | |
| 2015/0043673 A1 | 2/2015 | Lee et al. | |
| 2015/0078191 A1 | 3/2015 | Jongren et al. | |
| 2016/0197659 A1* | 7/2016 | Yu | H04W 16/28 |
| | | | 370/335 |

OTHER PUBLICATIONS

"Analysis and Conclusions for SON for UE Type", Ericsson, R3-140796, 3GPP TSG-RAN WG3 Meeting #83bis, (Mar. 21, 2014).

"CoMP Schemes and Backhaul Signalling for NIB", Hitachi Ltd., RI-135404, 3GPP TSG RAN WG1 Meeting #75, (Nov. 2, 2013).

"Fast Handover using RSRP/RSRQ with SToS/Ping-pong Avoidance", Intel C0rp., R2-132809, 3GPP TSG RAN WG2 Meeting #83, (Aug. 10, 2013).

"International Application Serial No. PCT/US2015/000281, International Search Report dated Apr. 22, 2016", 4 pgs.

"International Application Serial No. PCT/US2015/000281, Written Opinion dated Apr. 22, 2016", 4 pgs.

"European Application Serial No. 15891998.5, Extended European Search Report dated Dec. 12, 2018", 8 pgs.

"European Application Serial No. 15891998.5, Response filed Mar. 28, 2019 to Extended European Search Report dated Dec. 12, 2018", 15 pgs.

* cited by examiner

ENHANCED RADIO RESOURCE MANAGEMENT REPORTING IN CELLULAR SYSTEMS

PRIOR APPLICATION

This Application is a U.S. National Stage Application under 35 U.S.C. 371 from International Application No. PCT/US2015/000281, filed Dec. 23, 2015, which claims the benefit of priority to U.S. Provisional Application No. 62/161,584, filed May 14, 2015, and entitled "METHOD OF ENHANCED RRM MEASUREMENTS WITH MIMO AND IRC SUPPORT", each of which are incorporated by reference herein in their entirety.

TECHNICAL FIELD

Embodiments pertain to wireless communications. Some embodiments relate to wireless networks including 3GPP (Third Generation Partnership Project) networks, 3GPP LTE (Long Term Evolution) networks, 3GPP LTE-A (LTE Advanced) networks, and 5G networks, although the scope of the embodiments is not limited in this respect. Some embodiments are directed to radio resource management (RRM) measurements made by user equipment (UE) devices and reported to the cellular base station.

BACKGROUND

In cellular systems, when a mobile user equipment (UE) moves from one cell to another, it performs cell selection/reselection and handover operations. Also, the UE performs radio resource management (RRM) measurements of the reference signal quality transmitted by the neighboring cells. In current long-term evolution (LTE) systems, a UE reports two parameters using reference signals: reference signal received power (RSRP) and reference signal received quality (RSRQ).

RSRP provides information about signal power from a specific cell while excluding noise and interference from other cells. It is defined as the average power of Resource Elements (RE) that carry cell specific reference signals (RS) over the entire bandwidth, i.e. RSRP is only measured in the symbols carrying the RS. For RSRP, the UE measures the power of multiple resource elements used to transmit the reference signal and takes their average. RSRQ (Reference Signal Received Quality) provides the link quality considering also RSSI (Received Signal Strength Indicator) and the number of used Resource Blocks (N). RSRQ is indicative of the quality of the received reference signal including the contribution of interference.

Conventional RRM measurements convey power information of the target and interfering cells. However, it is not sufficient to accurately judge the link quality for more advanced receiver structures with multiple receive antennas, particularly for inter-frequency handovers. The existing measurements based on RSRP would not be sufficient for reliable handover decision, since the MIMO dimension is lost in the current measurements.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the following figures of the accompanying drawings.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
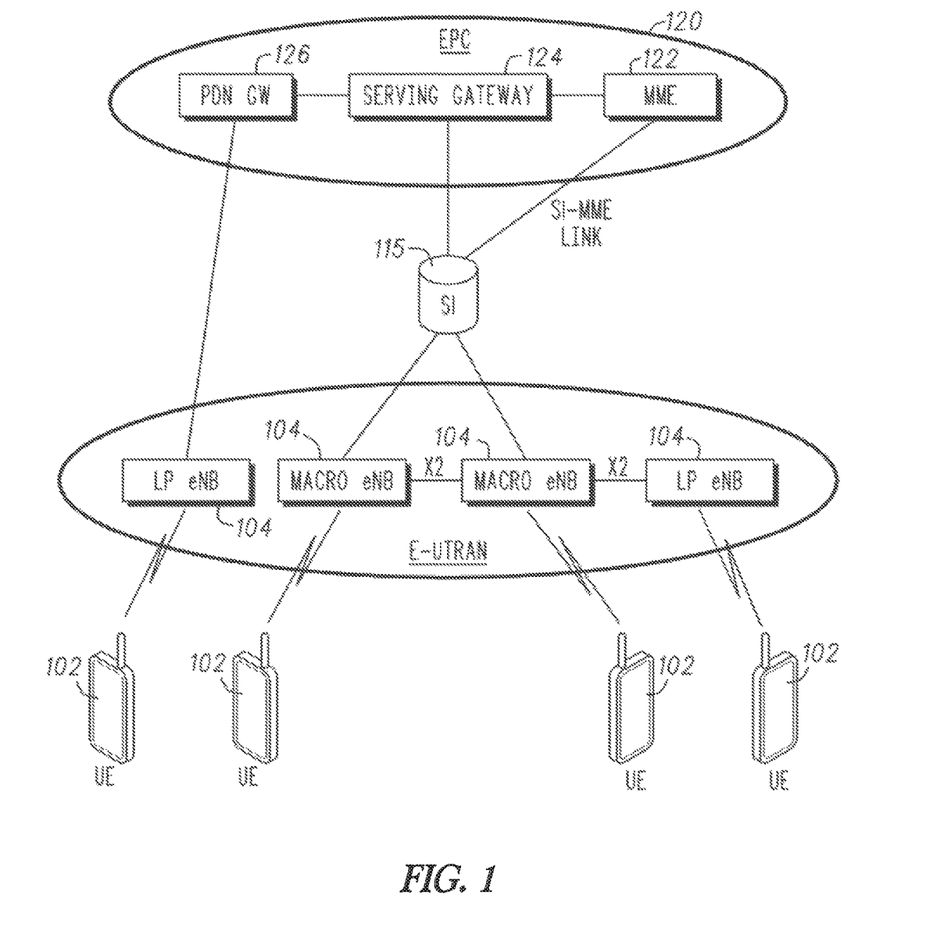
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity sake, only a portion of the core network 120, as well as the RAN 101, is shown.

The core network 120 includes a mobility management entity (MME) 122, a serving gateway (serving GW) 124, and packet data network gateway (PDN GW) 126. The RAN 101 includes Evolved Node-B's (eNBs) 104 (which may operate as base stations) for communicating with User Equipment (UE) 102. The eNBs 104 may include macro eNBs and low power (LP) eNBs. In accordance with some embodiments, the eNB 104 may transmit a downlink control message to the UE 102 to indicate an allocation of physical uplink control channel (PUCCH) channel resources. The UE 102 may receive the downlink control message from the eNB 104, and may transmit an uplink control message to the eNB 104 in at least a portion of the PUCCH channel resources. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of JP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 101 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 101 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and hybrid automatic repeat request (HARQ) information related to the uplink shared channel. Typically, downlink scheduling (e.g., assigning control and shared channel resource blocks to UEs 102 within a cell) may be performed at the eNB 104 based on channel quality information fed back from the UEs 102 to the eNB 104, and then the downlink resource assignment information may be sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

As used herein, the term circuitry may refer to, be part of, or include an Application Specific Integrated Circuit (ASIC), an electronic circuit, a processor (shared, dedicated, or group), or memory (shared, dedicated, or group) that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware or software.

Figure 2:
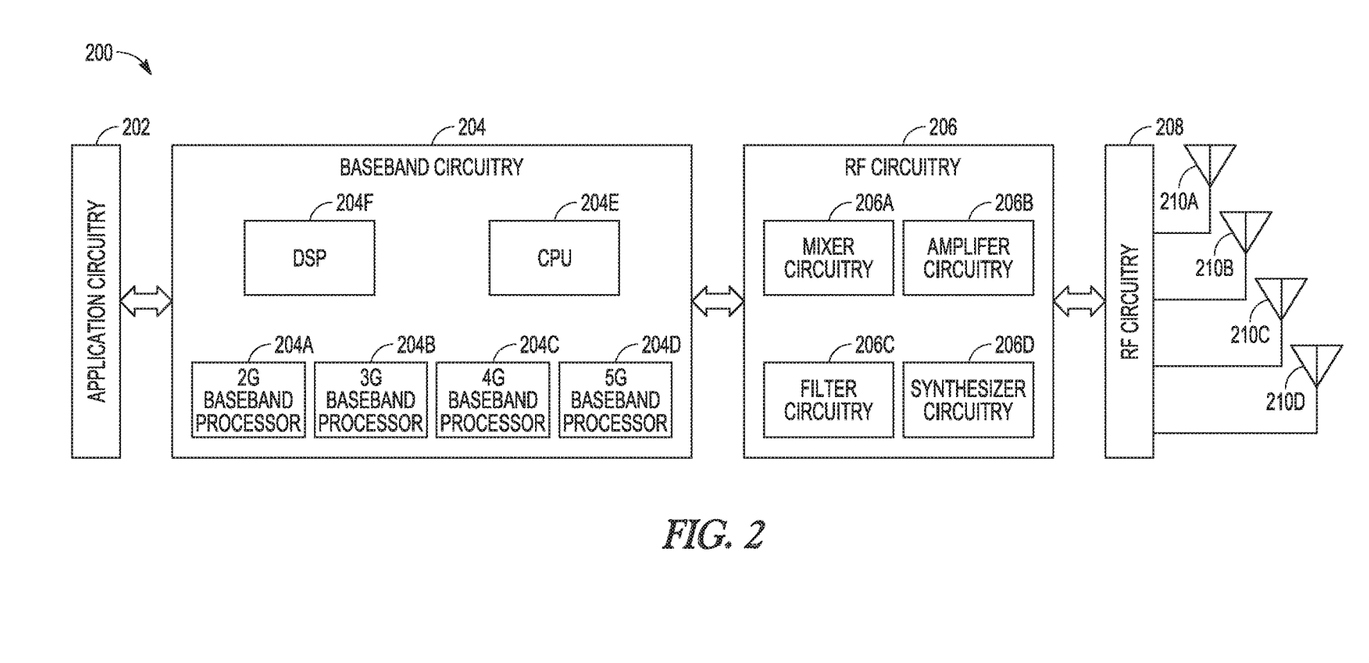
FIG. 2 is a block diagram of a User Equipment (UE) in accordance with some embodiments.

FIG. 2 is a functional diagram of a User Equipment (UE) in accordance with some embodiments. The UE 200 may be suitable for use as a UE 102 as depicted in FIG. 1. In some embodiments, the UE 200 may include application circuitry 202, baseband circuitry 204, Radio Frequency (RF) circuitry 206, front-end module (FEM) circuitry 208 and multiple antennas 210A-210D, coupled together at least as shown. In some embodiments, other circuitry or arrangements may include one or more elements or components of the application circuitry 202, the baseband circuitry 204, the RF circuitry 206 or the FEM circuitry 208, and may also include other elements or components in some cases. As an example, "processing circuitry" may include one or more elements or components, some or all of which may be included in the application circuitry 202 or the baseband circuitry 204. As another example, "transceiver circuitry" may include one or more elements or components, some or all of which may be included in the RF circuitry 206 or the FEM circuitry 208. These examples are not limiting, however, as the processing circuitry or the transceiver circuitry may also include other elements or components in some cases.

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the system.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), or radio resource control (RRC) elements. A central processing unit (CPU) 204e of the baseband circuitry 204 may be configured to run elements of the protocol stack for signaling of the PHY, MAC, RLC, PDCP or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect. In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206. In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider. The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer. In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more of the antennas 210A-D, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210A-D.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210. In some embodiments, the UE 200 may include additional elements such as, for example, memory/storage, display, camera, sensor, or input/output (I/O) interface.

Figure 3:
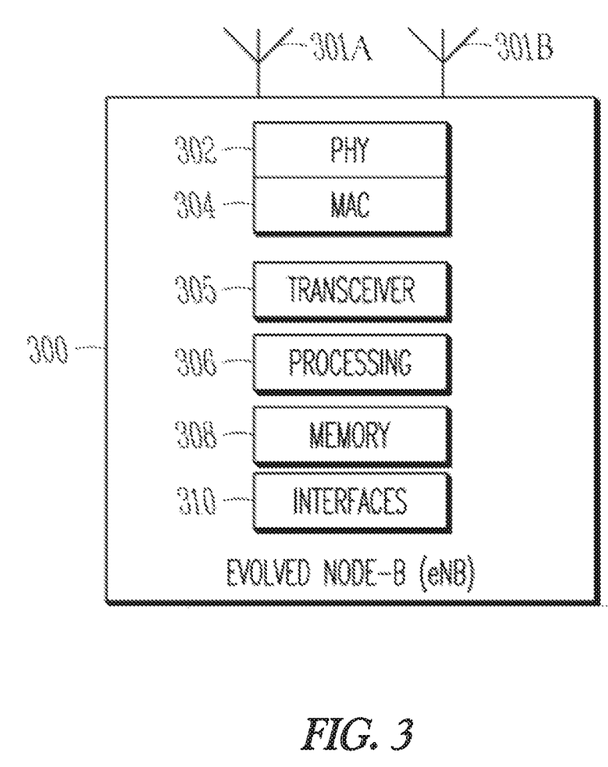
FIG. 3 is a block diagram of an Evolved Node-B (eNB) in accordance with some embodiments.

FIG. 3 is a functional diagram of an Evolved Node-B (eNB) in accordance with some embodiments. It should be noted that in some embodiments, the eNB 300 may be a stationary non-mobile device. The eNB 300 may be suitable for use as an eNB 104 as depicted in FIG. 1. The eNB 300 may include physical layer circuitry 302 and a transceiver 305, one or both of which may enable transmission and reception of signals to and from the UE 200, other eNBs, other UEs or other devices using one or more antennas 301A-B. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof.

The antennas 210A-D, 301A-B may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210A-D, 301A-B may be effectively separated to take advantage of spatial diversity and the different channel characteristics that may result.

In some embodiments, the UE 200 or the eNB 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive or transmit information wirelessly. In some embodiments, the UE 200 or eNB 300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 200, eNB 300 or other device may include one or more of a keyboard, a display, a non-volatile memory port, multiple antennas, a graphics processor, an application processor, speakers, and other mobile device elements. The display may be an LCD screen including a touch screen.

Although the UE 200 and the eNB 300 are each illustrated as having several separate functional elements, one or more of the functional elements may be combined and may be implemented by combinations of software-configured elements, such as processing elements including digital signal processors (DSPs), or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 200 or eNB 300 may include various components of the UE 200 or the eNB 300 as shown in FIGS. 2-3. Accordingly, techniques and operations described herein that refer to the UE 200 (or 102) may be applicable to an apparatus for a UE. In addition, techniques and operations described herein that refer to the eNB 300 (or 104) may be applicable to an apparatus for an eNB.

Figure 4:
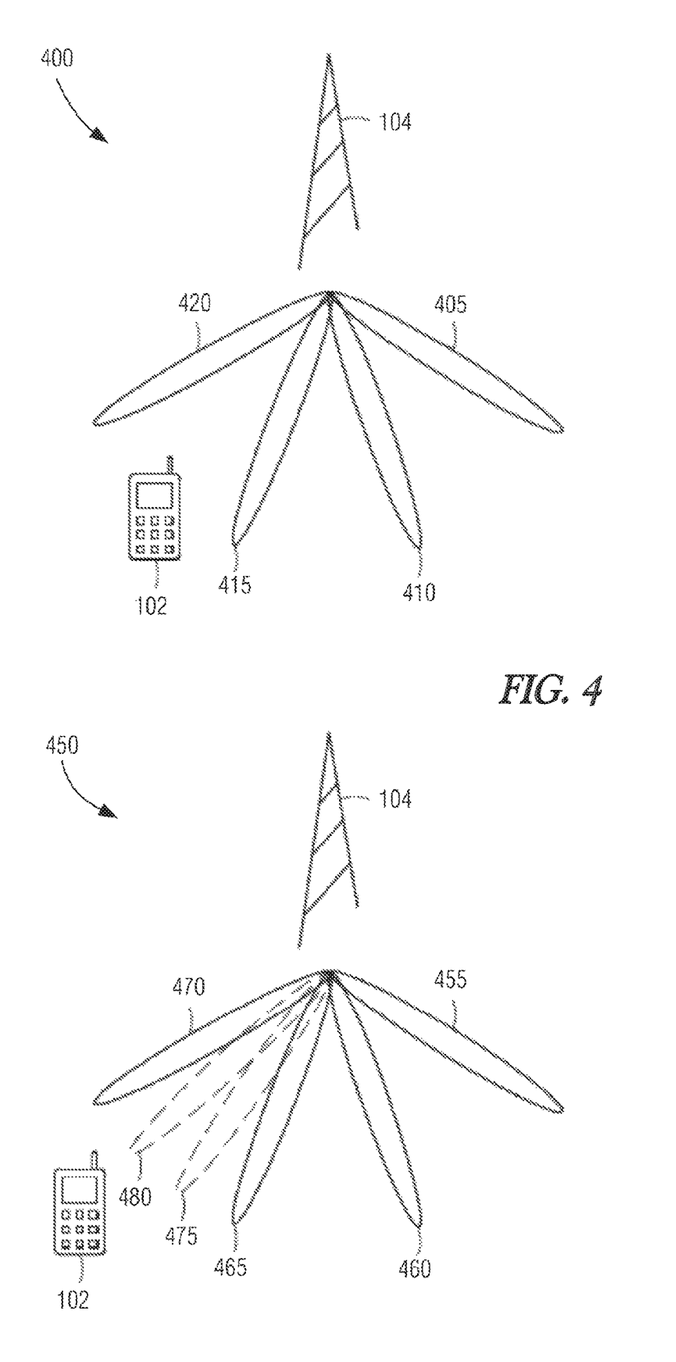
FIG. 4 illustrates examples of multiple beam transmission in accordance with some embodiments.

FIG. 4 illustrates examples of multiple beam transmission in accordance with some embodiments. Although the example scenarios 400 and 450 depicted in FIG. 4 may illustrate some aspects of techniques disclosed herein, it will be understood that embodiments are not limited by example scenarios 400 and 450. Embodiments are not limited to the number or type of components shown in FIG. 4 and are also not limited to the number or arrangement of transmitted beams shown in FIG. 4.

In example scenario 400, the eNB 104 may transmit a signal on multiple beams 405-420, any or all of which may be received at the UE 102. It should be noted that the number of beams or transmission angles as shown are not limiting. As the beams 405-420 may be directional, transmitted energy from the beams 405-420 may be concentrated in the direction shown. Therefore, the UE 102 may not necessarily receive a significant amount of energy from beams 405 and 410 in some cases, due to the relative location of the UE 102.

UE 102 may receive a significant amount of energy from the beams 415 and 420 as shown. As an example, the beams 405-420 may be transmitted using different reference signals, and the UE 102 may determine channel-state information (CSI) feedback or other information for beams 415 and 420. In some embodiments, each of beams 405-420 are configured as CSI reference signals (CSI-RS). In related embodiments, the CSI-RS signal is a part of the discovery reference signaling (DRS) configuration. The DRS configuration may serve to inform the UE 102 about the physical resources (e.g., subframes, subcarriers) on which the CSI-RS signal will be found. In related embodiments, the UE 102 is further informed about any scrambling sequences that are to be applied for CSI-RS.

In some embodiments, up to 2 MIMO layers may be transmitted within each beam by using different polarizations. More than 2 MIMO layers may be transmitted by using multiple beams. In related embodiments, the UE is configured to discover the available beams and report those discovered beams to the eNB prior to the MIMO data transmissions using suitable reporting messaging. Based on the reporting messaging, the eNB 104 may determine suitable beam directions for the MIMO layers to be used for data communications with the UE 102. In various embodiments, there may be up to 2, 4, 8, 16, 32, or more MIMO layers, depending on the number of MIMO layers that are supported by the eNB 104 and UE 102. In a given scenario, the number of MIMO layers that may actually be used will depend on the quality of the signaling received at the UE 102, and the availability of reflected beams arriving at diverse angles at the UE 102 such that the UE 102 may discriminate the data carried on the separate beams.

In the example scenario 450, the UE 102 may determine angles or other information (such as CSI feedback, channel-quality indicator (CQI) or other) for the beams 465 and 470. The UE 102 may also determine such information when received at other angles, such as the illustrated beams 475 and 480. The beams 475 and 480 are demarcated using a dotted line configuration to indicate that they may not necessarily be transmitted at those angles, but that the UE 102 may determine the beam directions of beams 475 and 480 using such techniques as receive beam-forming, as receive directions. This situation may occur, for example, when a transmitted beam reflects from an object in the vicinity of the UE 102, and arrives at the UE 102 according to its reflected, rather than incident, angle.

In some embodiments, the UE 102 may transmit one or more channel state information (CSI) messages to the eNB 104 as reporting messaging. Embodiments are not limited to dedicated CSI messaging, however, as the UE 102 may include relevant reporting information in control messages or other types of messages that may or may not be dedicated for communication of the CSI-type information.

As an example, the first signal received from the first eNB 104 may include a first directional beam based at least partly on a first CSI-RS signal and a second directional beam based at least partly on a second CSI-RS signal. The UE 102 may determine a rank indicator (RI) for the first CSI-RS and an RI for the second CSI-RS, and may transmit both RIs in the CSI messages. In addition, the UE 102 may determine one or more RIs for the second signal, and may also include them in the CSI messages in some cases. In some embodiments, the UE 102 may also determine a CQI, a precoding matrix indicator (PMI), receive angles or other information for one or both of the first and second signals. Such information may be included, along with one or more RIs, in the one or more CSI messages. In some embodiments, the UE 102 performs reference signal receive power (RSRP) measurement, received signal strength indication (RSSI) measurement, reference signal receive quality (RSRQ) measurement, or some combination of these using CSI-RS signals.

RSRP provides information about signal power from a specific cell while excluding noise and interference from other cells. RSRP levels for usable signal typically range from about −70 dBm close in to an LTE cell site to −125 dBm at the cell-edge. RSRP is defined as the average power of Resource Elements (RE) that carry cell specific Reference Signals (RS) over the entire bandwidth, i.e., RSRP is only measured in the symbols carrying RS. For RSRP, UE measures the power of multiple resource elements used to transmit the reference signal and takes an average of them. The reporting range for RSRP supported by LTE signaling is currently defined as −44 . . . −140 dBm.

RSRQ provides the link quality considering also RSSI (Received Signal Strength Indicator) and the number of used Resource Blocks (N) and defined as RSRQ=(N*RSRP)/RSSI, where RSRP and RSSI are measured over the same bandwidth. RSRQ may be also considered is a SINR-type of measurement and it indicates the quality of the received reference signal including interference contribution. The RSRQ measurement includes interference contribution in RSSI. It also provides information about loading of the channel, which is especially important for inter-frequency handover or cell reselection, where RSRP information is typically not sufficient to make a reliable decision. The interference level is included in RSSI measurements that contain information about the average total received power observed e.g., in OFDM symbols containing reference symbols for antenna port 0 (i.e., OFDM symbol 0 and 4 in a slot) in the measurement bandwidth over N resource blocks. The total received power of the RSSI includes the power from co-channel serving and non-serving interfering cells, adjacent channel interference, thermal noise, etc.

LTE specification provides the flexibility of using RSRP, RSRQ, or both to assist handover decisions. RSRP, RSRQ must be measured over the same bandwidth either narrowband with N=62 Sub Carriers (6 Resource Blocks) or Wideband with N=full bandwidth (up to 100 Resource Blocks/20 MHz). RRM measurements convey power information of the target and interfering cells.

Some aspects of the embodiments are directed to extending RRM measurements to convey MIMO-related information and IRC-related (Interference Rejection Capability) information of different cells to the eNB. The MIMO-related information can be used to dimension the serving channel and estimate (e.g., on average) the expected number of layers that can be served to the UE, such as after inter-frequency handover, for example. Similarly, the IRC-related information may be used by the eNB to estimate the signal quality after interference rejection at the UE receiver, e.g. also after inter-frequency handover.

In accordance with some embodiments, a new set of RRM measurements are defined to convey information about the serving and interfering signal spatial structure considering multiple antennas at the UE and/or eNB. In some embodiments, the RSRP and RSRQ definitions are enhanced to include measurement and reporting of the multiple values for each target cell eNB.

Figure 5:
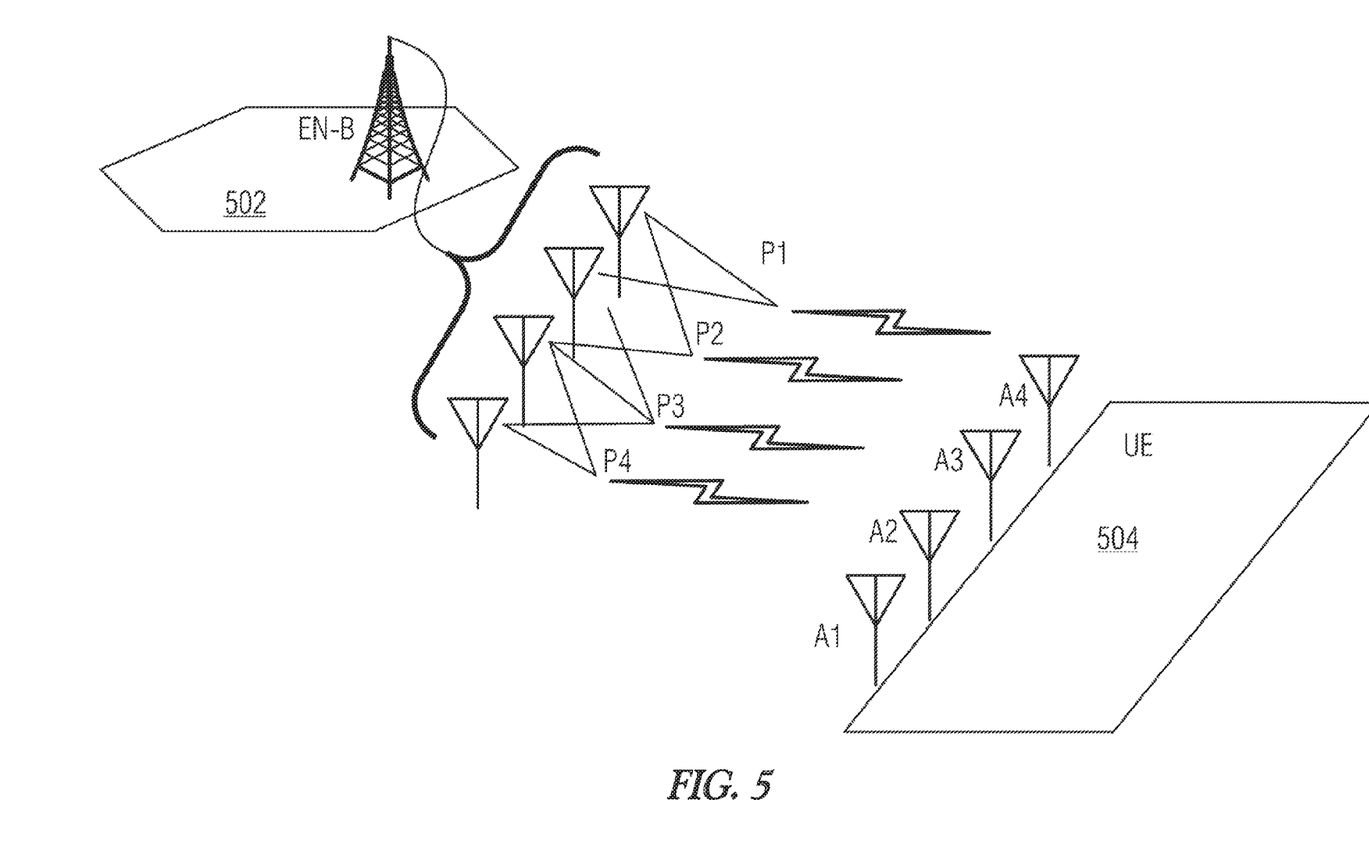
FIG. 5 is a diagram illustrating a MIMO transmission scenario utilizing an eNB and a UE, each having multiple antennas according to some embodiments.

FIG. 5 is a diagram illustrating a MIMO transmission scenario utilizing an eNB and a UE, each having multiple antennas according to some embodiments. eNB 502 has multiple antennas, as depicted, which may be used in various groupings, and with various signal modifications for each grouping, to effectively produce a plurality of antenna ports P1-P4. In various embodiments within the framework of the illustrated example, each antenna port P1-P4 may be defined for 1, 2, 3, or 4 antennas. Each antenna port P1-P4 may correspond to a different transmission signal direction. Using the different antenna ports, eNB 502 may transmit multiple layers with codebook-based or non-codebook-based precoding techniques. According to some embodiments, antenna port-specific CSI-RS signals are transmitted at via respective antenna port. In other embodiments, there may be more, or fewer, antenna ports available at the eNB than the four antenna ports as illustrated in FIG. 5.

On the UE side, there are a plurality of receive antennas. As illustrated in the example of FIG. 5, there four receive antennas, A1-A4. The multiple receive antennas may be used selectively to create receive beam forming. Receive beam forming may be used advantageously to increase the receive antenna gain for the direction(s) on which desired signals are received, and to suppress interference from neighboring cells, provided of course that the interference is received along different directions than the desired signals.

According to some embodiments, the UE may be configured to perform multiple RRM measurements for different spatial transmit/receive configurations. In some embodiments, for example, multiple reporting values may correspond to different eigenvalues of the variance matrix measured using the reference signal received on multiple antennas at the UE receiver.

More specifically, an enhanced RSRP measurement may be made wherein UE may be configured with reference signal with one, two or more antenna ports of the eNB (Np>=1). In this example, the reference signals for each antenna port may be based on non zero-power CSI-RS (NZP CSI-RS) signals.

Upon NZP CSI-RS configuration, the UE may perform the RRP measurements for each pair of the receive antenna and reference signal-transmitting antenna port of the eNB. The measurements may be stored in a data structure, such as a $N_{rx} \times N_p$ matrix, where $N_{rx}$ is the number of receive antennas, and $N_p$ is the number of transmission ports used by the eNB. For instance, in the case where there are four antenna ports at the eNB and four receive antennas at the UE, as depicted in the example of FIG. 5, the complete set of measurements may be saved as matrix R as follows:

$$R = \begin{bmatrix} P1{:}A1 & P2{:}A2 & P3{:}A1 & P4{:}A1 \\ P1{:}A2 & P2{:}A2 & P3{:}A2 & P4{:}A2 \\ P1{:}A3 & P2{:}A3 & P3{:}A3 & P4{:}A3 \\ P1{:}A4 & P2{:}A4 & P3{:}A4 & P4{:}A4 \end{bmatrix},$$

where Px:Ay represents the measured RRM value, for each respective antenna port-receive antenna pairing, for each resource element (RE).

The set of the measured enhanced RSRP for a given cell is then calculated as a set of eigenvalues, e.g.:

$$eRSRP = \text{eigval}\{E(R \cdot R^H)\},$$

where the eigval(A) operation calculates the eigenvalues for the square matrix A, and E(·) is an averaging function across reference signal resource elements.

For example, the eigen-values of complex Hermitian matrix A of dimension Nrx×$N_{rx}$ can be obtained by eiqenvector decomposition of matrix A:

$$A = U \cdot S \cdot U^H = U \cdot \begin{bmatrix} \lambda_1 & 0 & \cdots & 0 \\ 0 & \lambda_2 & & \vdots \\ \vdots & & \ddots & 0 \\ 0 & \cdots & 0 & \lambda_N \end{bmatrix} \cdot U^H,$$

where U is the unitary matrix of dimension Nrx-by-Nrx containing eigen-vectors and $\lambda_1, \lambda_2, \ldots, \lambda_{N_{rx}}$ are required $N_{rx}$ real-valued eigen values. Here, the eigen values describe the dimensionality of the channel. The eigen values themselves represent the measurement, on average, for each potential beam direction. In a related embodiment, reporting of the eigen values to the eNB provides the spatial communication performance.

In a related aspect, an enhanced RSSI measurement can be defined as eRSSI=eigval $\{E(r \cdot r^H)\}$, where r for each RE has a dimension of $N_{rx}$ by 1 and represents the received signal measurements on all receive antennas of the UE on all resource elements within the measurement bandwidth across all, or subset, of OFDM symbols e.g., containing reference signals, or containing other communications.

An eRSRQ computation may be then defined as the ratio of (N*eRSRP)/eRSSI. The number of RSRP, RSSI and RSRQ measurements for each measured cell may be further limited to Np or min($N_{rx}$, $N_p$). In a related embodiment, the subset of the measured RSRP, RSSI and RSRQ values are reported by the UE to the eNB based on one or more predefined triggering conditions.

Figure 6:
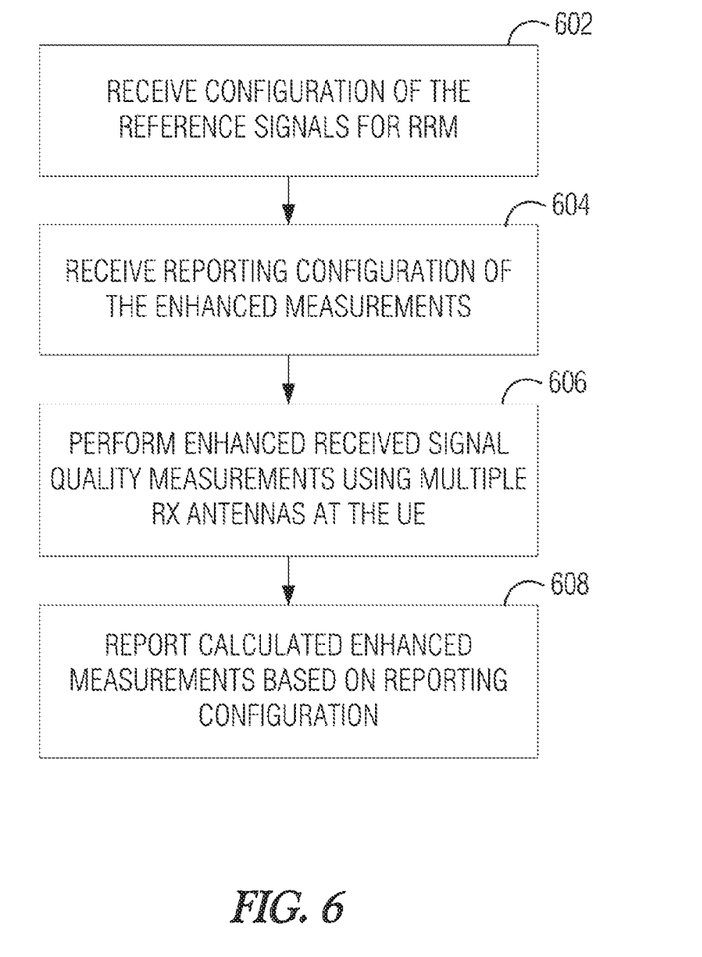
FIG. 6 is a flow diagram illustrating an example process for enhanced RRM performed by a UE according to some embodiments.

FIG. 6 is a flow diagram illustrating an example process for enhanced RRM performed by a UE according to some embodiments. At 602, the UE receives configuration information from the eNB regarding the RRM reference signaling. For example, this may include relevant information regarding the CSI-RS signaling. At 604, the UE receives configuration information that establishes the reporting mode—i.e., the use of enhanced measurements to provide reference signal reporting that takes spatial transmission/reception performance into account. At 606, the UE performs the enhanced signal quality measurements for each reference signal received from its corresponding antenna port of the eNB, for each of the UE's multiple antennas. At 608, the UE computes the enhanced measurements according to the reporting configuration established by the eNB.

Additional notes and examples:

Example 1 is apparatus for User Equipment (UE), the apparatus comprising transceiver circuitry, and processing circuitry, the processing circuitry to: control the transceiver circuitry to receive reference signals from a first evolved-node B (eNB) via a plurality of receive antennas of the UE, the reference signals relating to at least one antenna port of the first eNB through which corresponding reference signals were sent; perform received signal measurement of at least a portion of the reference signals for a plurality of combinational groupings of the at least one antenna port of the eNB and the UE receive antennas to produce enhanced received signal quality (eRSQ) measurements that represent spatial characteristics of different channels corresponding to the reference signals as received by the UE; and control the transceiver circuitry to send a report to the first eNB based on the eRSQ measurements, the report being indicative of spatial multiplexing layer availability of a corresponding channel between the UE and the first eNB In Example 2, the subject matter of Example 1 optionally includes, wherein the reference signals includes channel-state information reference signals (CSI-RS).

In Example 3, the subject matter of any one or more of Examples 1-2 optionally include, wherein the reference signals includes channel-state information reference signaling (CSI-RS) comprising a plurality of CSI-RS signals, each CSI-RS signal corresponding to an antenna port of the first eNB.

In Example 4, the subject matter of any one or more of Examples 1-3 optionally include, wherein the plurality of the combinational groupings are eNB antenna port and UE receive antenna pairings.

In Example 5, the subject matter of any one or more of Examples 1-4 optionally include, wherein the eRSQ measurements represent spatial channel characteristics for a plurality of different multiple input/multiple output (MIMO) layers.

In Example 6, the subject matter of any one or more of Examples 1-5 optionally include, wherein the processing circuitry is further to: control the transceiver circuitry to receive configuration information from the first eNB, wherein the configuration information instructs the UE to perform the eRSQ measurements and reporting.

In Example 7, the subject matter of any one or more of Examples 1-6 optionally include, wherein the processing circuitry is further to: control the transceiver circuitry to receive configuration information from the first eNB, wherein the configuration information contains an indication from which the processing circuitry is to determine a number of the antenna ports of the first eNB.

In Example 8, the subject matter of any one or more of Examples 1-7 optionally include, wherein the report includes radio resource management (RRM) message.

In Example 9, the subject matter of any one or more of Examples 1-8 optionally include, wherein the eRSQ measurements are based on a computed aggregation of receive power measurements over a plurality of spatial channels.

In Example 10, the subject matter of any one or more of Examples 1-9 optionally include, wherein the eRSQ measurements are based on a computed aggregation of ratios of receive signal power measurements and receive signal strength measurements, over a plurality of spatial channels.

In Example 11, the subject matter of any one or more of Examples 1-10 optionally include, wherein the processing circuitry is further to: while the UE is connected to the first eNB, control the transceiver circuitry to receive, via the plurality of receive antennas, adjacent cell signals from a second eNB sent via at least one antenna port of the second eNB; perform interfering received signal measurement of at least a portion of the adjacent cell signals for a plurality of UE receive antennas to produce an interference profile representing spatial characteristics of interference signals originating at the second eNB as received by the UE.

In Example 12, the subject matter of Example 11 optionally includes, wherein the interference profile is reported to the eNB.

In Example 13, the subject matter of any one or more of Examples 1-12 optionally include, wherein the received signal measurement is defined over 6 resource blocks.

In Example 14, the subject matter of any one or more of Examples 1-13 optionally include, wherein the received signal measurement is defined over one hundred resource blocks.

In Example 15, the subject matter of any one or more of Examples 1-14 optionally include, wherein the plurality of receive antennas includes two receive antennas.

In Example 16, the subject matter of any one or more of Examples 1-15 optionally include, wherein the plurality of receive antennas consists of four receive antennas.

In Example 17, the subject matter of any one or more of Examples 1-16 optionally include, wherein the reference signaling includes non-zero-power channel state information reference signals (NZ CSI-RS).

In Example 18, the subject matter of any one or more of Examples 1-17 optionally include, wherein the received signal measurements are stored as a $N_{rx} \times N_p$ matrix R, wherein $N_{rx}$ is the number of the receive antennas and $N_p$ is the number of antenna ports of the first eNB for each resource element (RE) of the first eNB.

In Example 19, the subject matter of Example 18 optionally includes, wherein the report based on the eRSRQ measurements is based on a first set of eigenvalues defined as eRSRP=eigval$\{E(R \cdot R^H)\}$, wherein eigval$\{\ \}$ corresponds to the eigenvalue computation for a square matrix, E is an averaging function, and $R^H$ is the conjugation and transpose of matrix R.

In Example 20, the subject matter of Example 19 optionally includes, wherein the report based on the eRSRQ measurements is further based on a second set of eigenvalues defined as eRSSI=eigval$\{E(r \cdot r^H)\}$, wherein eigval$\{\ \}$ corresponds to the eigenvalues for a square matrix, E is an averaging function, and $r^H$ is the conjugation and transpose of vector r, wherein vector r contains the received signal measurements on all receive antennas of the UE on all resource elements.

In Example 21, the subject matter of Example 20 optionally includes, wherein the report based on the eRSRQ measurements is further based on a ratio defined as N·eRSRP/eRSSI, wherein N is the number of resource blocks, and the number of eRSRP and eRSSI values for eRSRQ calculation can be determined from the minimum of $N_{rx}$ and $N_p$.

Example 22 is a computer-readable medium containing instructions that, when executed on processing circuitry of User Equipment (UE), cause the UE to: receive reference signals from a first evolved-node B (eNB) via a plurality of receive antennas of the UE, the reference signals relating to at least one antenna port of the first eNB through which corresponding reference signals were sent; perform received signal measurement of at least a portion of the reference signals for a plurality of combinational groupings of the at least one antenna port of the eNB and the UE receive antennas to produce enhanced received signal quality (eRSQ) measurements that represent spatial characteristics of different channels corresponding to the reference signals as received by the UE; and send a report to the first eNB based on the eRSQ measurements, the report being indicative of spatial multiplexing layer availability of a corresponding channel between the UE and the first eNB In Example 23, the subject matter of Example 22 optionally includes, wherein the reference signals includes channel-state information reference signals (CSI-RS).

In Example 24, the subject matter of any one or more of Examples 22-23 optionally include, wherein the reference signals includes channel-state information reference signaling (CSI-RS) comprising a plurality of CSI-RS signals, each CSI-RS signal corresponding to an antenna port of the first eNB.

In Example 25, the subject matter of any one or more of Examples 22-24 optionally include, wherein the plurality of the combinational groupings are eNB antenna port and UE receive antenna pairings.

In Example 26, the subject matter of any one or more of Examples 22-25 optionally include, wherein the eRSQ measurements represent spatial channel characteristics for a plurality of different multiple input/multiple output (MIMO) layers.

In Example 27, the subject matter of any one or more of Examples 22-26 optionally include, wherein the instructions are further to cause the UE to: receive configuration information from the first eNB, wherein the configuration information instructs the UE to perform the eRSQ measurements and reporting.

In Example 28, the subject matter of any one or more of Examples 22-27 optionally include, wherein the instructions are further to cause the UE to: receive configuration information from the first eNB, wherein the configuration information contains an indication from which the processing circuitry is to determine a number of the antenna ports of the eNB.

In Example 29, the subject matter of any one or more of Examples 22-28 optionally include, wherein the report includes radio resource management (RRM) message.

In Example 30, the subject matter of any one or more of Examples 22-29 optionally include, wherein the eRSQ measurements are based on a computed aggregation of receive power measurements over a plurality of spatial channels.

In Example 31, the subject matter of any one or more of Examples 22-30 optionally include, wherein the eRSQ measurements are based on a computed aggregation of ratios of receive signal power measurements and receive signal strength measurements, over a plurality of spatial channels.

In Example 32, the subject matter of any one or more of Examples 22-31 optionally include, wherein the instructions are further to cause the UE to: while the UE is connected to the first eNB, receive, via the plurality of receive antennas, adjacent cell signals from a second eNB sent via at least one antenna port of the second eNB; perform interfering received signal measurement of at least a portion of the adjacent cell signals for a plurality UE receive antennas to produce an interference profile representing spatial characteristics of interference signals originating at the second eNB as received by the UE.

In Example 33, the subject matter of Example 32 optionally includes, wherein the interference profile is reported to the eNB.

In Example 34, the subject matter of any one or more of Examples 22-33 optionally include, wherein the received signal measurement is defined over 6 resource blocks.

In Example 35, the subject matter of any one or more of Examples 22-34 optionally include, wherein the received signal measurement is defined over one hundred resource blocks.

In Example 36, the subject matter of any one or more of Examples 22-35 optionally include, wherein the plurality of receive antennas includes two receive antennas.

In Example 37, the subject matter of any one or more of Examples 22-36 optionally include, wherein the plurality of receive antennas consists of four receive antennas.

In Example 38, the subject matter of any one or more of Examples 22-37 optionally include, wherein the reference signaling includes non-zero-power channel state information reference signals (NZ CSI-RS).

In Example 39, the subject matter of any one or more of Examples 22-38 optionally include, wherein the received signal measurements are stored as a $N_{rx} \times N_p$ matrix R, wherein $N_{rx}$ is the number of the receive antennas and Np is the number of antenna ports of the first eNB for each resource element (RE) of the first eNB.

In Example 40, the subject matter of Example 39 optionally includes, wherein the report based on the eRSRQ measurements is based on a first set of eigenvalues defined as eRSRP=eigval$\{E(R \cdot R^H)\}$, wherein eigval{ } corresponds to the eigenvalue computation for a square matrix, E is an averaging function, and $R^H$ is the conjugation and transpose of matrix R.

In Example 41, the subject matter of Example 40 optionally includes, wherein the report based on the eRSRQ measurements is further based on a second set of eigenvalues defined as eRSSI=eigval$\{E(r \cdot r^H)\}$, wherein eigval{ } corresponds to the eigenvalues for a square matrix, E is an averaging function, and $r^H$ is the conjugation and transpose of vector r, wherein vector r contains the received signal measurements on all receive antennas of the UE on all resource elements.

In Example 42, the subject matter of Example 41 optionally includes, wherein the report based on the eRSRQ measurements is further based on a ratio defined as N·eRSRP/eRSSI, wherein N is the number of resource blocks, and the number of eRSRP and eRSSI values for eRSRQ calculation can be determined from the minimum of $N_{rx}$ and $N_p$.

Example 43 is apparatus for User Equipment (UE), the apparatus comprising transceiver circuitry, and processing circuitry, the processing circuitry to: control the transceiver circuitry to connect with a first evolved-node B (eNB) via a plurality of receive antennas of the UE; while the UE is connected to the first eNB, control the transceiver circuitry to receive, via the plurality of receive antennas, adjacent cell signals from a second eNB; perform interfering received signal measurement of at least a portion of the adjacent cell signals for a plurality of UE receive antennas to produce an interference profile representing spatial characteristics of interference signals originating at the second eNB as received by the UE; and control the transceiver circuitry to send a report to the first eNB based on the interference profile In Example 44, the subject matter of Example 43 optionally includes, wherein the interference profile is represented as a computed aggregation of receive power measurements over a plurality of resource elements (REs) and orthogonal frequency division multiplexing (OFDM) symbols corresponding to individual ones of the plurality of receive antennas.

In Example 45, the subject matter of any one or more of Examples 43-44 optionally include, wherein the interfering received signal measurement is an enhanced received signal strength indication (eRSSI) represented as a vector of dimension Nrx, wherein Nrx is a quantity of the receive antennas at the UE, the vector contains signal strength measurements corresponding to each receive antenna and aggregated over a plurality of resource blocks.

In Example 46, the subject matter of any one or more of Examples 43-45 optionally include, wherein the interfering received signal measurement is defined over 6 resource blocks.

In Example 47, the subject matter of any one or more of Examples 43-46 optionally include, wherein the interfering received signal measurement is defined over one hundred resource blocks.

In Example 48, the subject matter of any one or more of Examples 43-47 optionally include, wherein the processing circuitry is further to: control the transceiver circuitry to receive configuration information from the first eNB, wherein the configuration information instructs the UE to perform the interfering received signal measurement.

In Example 49, the subject matter of any one or more of Examples 43-48 optionally include, wherein the plurality of receive antennas includes two receive antennas.

In Example 50, the subject matter of any one or more of Examples 43-49 optionally include, wherein the plurality of receive antennas include at least four receive antennas.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. Apparatus for User Equipment (UE), the apparatus comprising transceiver circuitry, and processing circuitry, the processing circuitry to:
decode measurement configuration information received from a first evolved node B (eNB) to configure the UE with one or more reference signal (RS) resource sets, to configure the UE for reference signal measurement per beam and for reporting beam measurement information per beam, the reference signal resource sets each comprising reference signal resources;
control the transceiver circuitry to receive reference signals within the reference signal resources of the reference signal resource sets from the eNB a plurality of receive antennas of the UE, the reference signals relating to at least one antenna port of the first eNB;
decode the received reference signals to determine a beam identifier for each of a plurality of beams of a cell;
perform received signal measurement of at least a portion of the reference signals for a plurality of combinational groupings of the at least one antenna port of the eNB and the UE receive antennas to produce enhanced received signal quality (eRSQ) measurements, on a per-beam basis, that represent spatial characteristics of different channels corresponding to the reference signals as received by the UE;
generate beam measurement reports from the eRSQ measurements, each beam measurement report comprising eRSQ per beam and the beam identifier associated with the beam; and
control the transceiver circuitry to send the beam measurement reports to the first eNB.

2. The apparatus of claim 1, wherein the reference signals includes channel-state information reference signaling (CSI-RS) comprising a plurality of CSI-RS signals, each CSI-RS signal mapped to an antenna port of the first eNB.

3. The apparatus of claim 1, wherein the eRSQ measurements represent spatial channel characteristics for a plurality of different multiple input/multiple output (MIMO) layers.

4. The apparatus of claim 1, wherein the eRSQ measurements are based on a computed aggregation of receive power measurements over a plurality of spatial channels.

5. The apparatus of claim 1, wherein the eRSQ measurements are based on a computed aggregation of ratios of receive signal power measurements and receive signal strength measurements, over a plurality of spatial channels.

6. The apparatus of claim 1, wherein the processing circuitry is further to:
while the UE is connected to the first eNB, control the transceiver circuitry to receive, via the plurality of receive antennas, adjacent cell signals from a second eNB sent via at least one antenna port of the second eNB;
perform interfering received signal measurement of at least a portion of the adjacent cell signals for a plurality of UE receive antennas to produce an interference profile representing spatial characteristics of interference signals originating at the second eNB as received by the UE.

7. The apparatus of claim 6, wherein the interference profile is reported to the eNB.

8. The apparatus of claim 1, wherein the reference signaling includes non-zero-power channel state information reference signals (NZ CSI-RS).

9. Apparatus for User Equipment (UE), the apparatus comprising transceiver circuitry, and processing circuitry, the processing circuitry to:
control the transceiver circuitry to receive reference signals from a first evolved-node B (eNB) via a plurality of receive antennas of the UE, the reference signals relating to at least one antenna port of the first eNB through which corresponding reference signals were sent;
perform received signal measurement of at least a portion of the reference signals for a plurality of combinational groupings of the at least one antenna port of the eNB and the UE receive antennas to produce enhanced received signal quality (eRSQ) measurements that represent spatial characteristics of different channels corresponding to the reference signals as received by the UE; and
control the transceiver circuitry to send a report to the first eNB based on the eRSQ measurements, the report being indicative of spatial multiplexing layer availability of a corresponding channel between the UE and the first eNB,
wherein the received signal measurements are stored as a Nrx×Np matrix R, wherein Nrx is the number of the receive antennas and Np is the number of antenna ports of the first eNB for each resource element (RE) of the first eNB.

10. The apparatus of claim 9, wherein the report based on the eRSRQ measurements is based on a first set of eigenvalues defined as eRSRP=eigval$\{E(R\cdot RH)\}$, wherein eigval$\{\ \}$ corresponds to the eigenvalue computation for a square matrix, E is an averaging function, and RH is the conjugation and transpose of matrix R.

11. The apparatus of claim 10, wherein the report based on the eRSRQ measurements is further based on a second set of eigenvalues defined as eRSSI=eigval$\{E(r\cdot rH)\}$, wherein eigval$\{\ \}$ corresponds to the eigenvalues for a square matrix, E is an averaging function, and rH is the conjugation and transpose of vector r, wherein vector r contains the received signal measurements on all receive antennas of the UE on all resource elements.

12. The apparatus of claim 11, wherein the report based on the eRSRQ measurements is further based on a ratio defined as N·eRSRP/eRSSI, wherein N is the number of resource blocks, and the number of eRSRP and eRSSI values for eRSRQ calculation can be determined from the minimum of Nrx and Np.

13. A non-transitory computer-readable storage medium containing instructions that, when executed on processing circuitry of User Equipment (UE), cause the UE to:
  decode measurement configuration information received from a first evolved node B (eNB) to configure the UE with one or more reference signal (RS) resource sets, to configure the UE for reference signal measurement per beam and for reporting beam measurement information per beam, the reference signal resource sets each comprising reference signal resources;
  receive reference signals within the reference signal resources of the reference signal resource sets from the eNB a plurality of receive antennas of the UE, the reference signals relating to at least one antenna port of the first eNB;
  decode the received reference signals to determine a beam identifier for each of a plurality of beams of a cell;
  perform received signal measurement of at least a portion of the reference signals for a plurality of combinational groupings of the at least one antenna port of the eNB and the UE receive antennas to produce enhanced received signal quality (eRSQ) measurements, on a per-beam basis, that represent spatial characteristics of different channels corresponding to the reference signals as received by the UE;
  generate beam measurement reports from the eRSQ measurements, each beam measurement report comprising eRSQ per beam and the beam identifier associated with the beam; and
  send the beam measurement reports to the first eNB.

14. The non-transitory computer-readable storage medium of claim 13, wherein the reference signals comprise channel-state information reference signals (CSI-RS).

15. The non-transitory computer-readable storage medium of claim 13, wherein the combinational groupings are eNB antenna port and UE receive antenna pairings.

16. The non-transitory computer-readable storage medium of claim 13, wherein the instructions are further to cause the UE to:
  receive configuration information from the first eNB, wherein the configuration information instructs the UE to perform the eRSQ measurements and reporting.

17. The non-transitory computer-readable storage medium of claim 13, wherein the instructions are further to cause the UE to:
  receive configuration information from the first eNB, wherein the configuration information contains an indication from which the processing circuitry is to determine a number of the antenna ports of the eNB.

18. The non-transitory computer-readable storage medium of claim 13, wherein the report includes radio resource management (RRM) message.

19. The non-transitory computer-readable storage medium of claim 13, wherein the eRSQ measurements are based on a computed aggregation of receive power measurements over a plurality of spatial channels.

20. The non-transitory computer-readable storage medium of claim 13, wherein the eRSQ measurements are based on a computed aggregation of ratios of receive signal power measurements and receive signal strength measurements, over a plurality of spatial channels.

21. The non-transitory computer-readable storage medium of claim 13, wherein the instructions are further to cause the UE to:
  while the UE is connected to the first eNB, receive, via the plurality of receive antennas, adjacent cell signals from a second eNB sent via at least one antenna port of the second eNB;
  perform interfering received signal measurement of at least a portion of the adjacent cell signals for a plurality UE receive antennas to produce an interference profile representing spatial characteristics of interference signals originating at the second eNB as received by the UE.

22. The non-transitory computer-readable storage medium of claim 21, wherein the interference profile is reported to the eNB.

23. A non-transitory computer-readable storage medium containing instructions that, when executed on processing circuitry of User Equipment (UE), cause the UE to:
  receive reference signals from a first evolved-node B (eNB) via a plurality of receive antennas of the UE, the reference signals relating to at least one antenna port of the first eNB through which corresponding reference signals were sent;
  perform received signal measurement of at least a portion of the reference signals for a plurality of combinational groupings of the at least one antenna port of the eNB and the UE receive antennas to produce enhanced received signal quality (eRSQ) measurements that represent spatial characteristics of different channels corresponding to the reference signals as received by the UE; and
  send a report to the first eNB based on the eRSQ measurements, the report being indicative of spatial multiplexing layer availability of a corresponding channel between the UE and the first eNB,
wherein the received signal measurements are stored as a Nrx×Np matrix R, wherein Nrx is the number of the receive antennas and Np is the number of antenna ports of the first eNB for each resource element (RE) of the first eNB.

24. The non-transitory computer-readable storage medium of claim 23, wherein the report based on the eRSRQ measurements is based on a first set of eigenvalues defined as eRSRP=eigval$\{E(R \cdot RH)\}$, wherein eigval$\{\}$ corresponds to the eigenvalue computation for a square matrix, E is an averaging function, and RH is the conjugation and transpose of matrix R.

25. The non-transitory computer-readable storage medium of claim 24, wherein the report based on the eRSRQ measurements is further based on a second set of eigenvalues defined as eRSSI=eigval$\{E(r \cdot rH)\}$, wherein eigval$\{\}$ corresponds to the eigenvalues for a square matrix, E is an averaging function, and rH is the conjugation and transpose of vector r, wherein vector r contains the received signal measurements on all receive antennas of the UE on all resource elements.

26. The non-transitory computer-readable storage medium of claim 25, wherein the report based on the eRSRQ measurements is further based on a ratio defined as N·eRSRP/eRSSI, wherein N is the number of resource blocks, and the number of eRSRP and eRSSI values for eRSRQ calculation can be determined from the minimum of Nrx and Np.

* * * * *

UNITED STATES PATENT AND TRADEMARK OFFICE
CERTIFICATE OF CORRECTION

PATENT NO. : 10,470,064 B2
APPLICATION NO. : 15/565202
DATED : November 5, 2019
INVENTOR(S) : Davydov et al.

It is certified that error appears in the above-identified patent and that said Letters Patent is hereby corrected as shown below:

In the Claims

Column 19, Line 22, Claim 1, delete "Apparatus" and insert --An apparatus-- therefor Column 20, Line 20, Claim 9, delete "Apparatus" and insert --An apparatus-- therefor Signed and Sealed this
Twenty-first Day of July, 2020

Andrei Iancu
*Director of the United States Patent and Trademark Office*